United States Patent
Jain et al.

(10) Patent No.: US 7,496,052 B2
(45) Date of Patent: Feb. 24, 2009

(54) AUTOMATIC VLAN ID DISCOVERY FOR ETHERNET PORTS

(75) Inventors: Vinit Jain, Austin, TX (US); Jorge R. Nogueras, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 545 days.

(21) Appl. No.: 11/260,583

(22) Filed: Oct. 27, 2005

(65) Prior Publication Data

US 2007/0097972 A1     May 3, 2007

(51) Int. Cl.
    *H04L 12/28* (2006.01)
(52) U.S. Cl. ...................................... 370/254
(58) Field of Classification Search .................. 370/254
    See application file for complete search history.

(56) References Cited

U.S. PATENT DOCUMENTS

| | | | | |
|---|---|---|---|---|
| 6,223,218 | B1* | 4/2001 | Iijima et al. ................ | 709/221 |
| 7,385,973 | B1* | 6/2008 | Johnson et al. ............ | 370/389 |
| 2004/0042416 | A1* | 3/2004 | Ngo et al. .................. | 370/254 |
| 2006/0002311 | A1* | 1/2006 | Iwanaga et al. ............ | 370/254 |

OTHER PUBLICATIONS

Allemang, et al., Local Area Network Switch Frame Lookup Technique for Increased Speed and Flexibility, IBM Technical Disclosure Bulletin, Jul. 1995, pp. 221-222.
IEEE 802.1Q Tag-based VLAN, Jun. 17, 2005, <http://www.zyxel.com/support/supportnote/ves1012/app/8021q.htm>.

* cited by examiner

*Primary Examiner*—Chirag G Shah
*Assistant Examiner*—Otis L Thompson, Jr.
(74) *Attorney, Agent, or Firm*—Matthew W. Baca; Dillon & Yudell LLP

(57) ABSTRACT

A method, system and network protocol that enables each host within a virtual local area network (VLAN) environment to automatically discover to which VLANs the host belongs. When a host initially sets up a communication interface, the host generates a series of probing packets, each including a different one of the range of possible VLAN IDs within the packet header. The probing packet requests a response from the switch indicating whether the corresponding VLAN (identified by the VLAN ID) is supported by the switch. The switch automatically drops any packets with a VLAN ID not recognized/supported/configured in the switch. The destination device only receives supported packets, and thus the interface only receives a response for those request packets having a VLAN ID associated with a supported VLAN. The host's interface then knows which VLAN ID(s) are supported, and the host assigns/utilizes only those VLAN IDs for outgoing traffic.

1 Claim, 4 Drawing Sheets

AUTOMATIC VLAN ID DISCOVERY FOR ETHERNET PORTS

BACKGROUND OF THE INVENTION

1. Technical Field

The present invention relates generally to computer networks and more specifically to Virtual Local Area Networks (VLANs). Still more particularly, the present invention relates to routing data packets from a host within a VLAN.

2. Description of the Related Art

A VLAN is a group of network devices on different physical LAN segments that are able to communicate with each other as if they were on the same physical LAN segment. Network devices and their respective network traffic can be mapped into VLAN groups using port-based VLAN mapping, MAC address-based VLAN mapping, protocol-based VLAN mapping, IP subnet-based VLAN mapping, and application-based VLAN mapping, or any combination thereof. The most widely accepted standard for implementing VLANs in an Ethernet network is defined by the IEEE in its 802.1Q standard. Implementing 802.1Q VLANs involves tagging packets with a Tag Control Information field that identifies the VLAN to which the packets belong. According to the 802.1Q standard, the Tag Control Information field includes a 12-bit VLAN Identifier (ID) field that enables VLANs to be uniquely identified.

One significant limitation of VLAN technology that utilizes the 802.1Q VLAN standard is that the length of the VLAN ID field in the 802.1Q VLAN tag is 12 bits. Consequently, any network in which VLANs are deployed is limited to 4,096 unique VLAN IDs (actually, the number of unique VLAN IDs is limited to 4,094 because the value of all ones is reserved and the value of all zeros indicates a priority tag). Because the redundant use of VLAN IDs in the same network should be avoided, the limited number of unique VLAN IDs that are possible using the 12-bit VLAN ID field limits the scalability of a network that utilizes 802.1Q VLANs.

Data which belongs to a VLAN may be tagged to identify that the data belongs to the VLAN. A VLAN tag may comprise, for example, a field in the header of a data frame. The tag may, for example, comprise a few bits which identify a VLAN ID number ("VID"). Within the conventional VLAN protocol, packets meant for different VLANs are tagged with a header specifying the VLAN tagID (referred to hereinafter as a VLAN ID) that distinguishes the traffic between VLANs traversing the same switch. Any number of physical ports of a particular switch may be associated with any number of groups within the switch by using the virtual local area network (VLAN) arrangement that virtually associates the port with a particular VLAN designation. More specifically, the switch or hub associates VLAN designations with its ports and further associates those VLAN designations with messages transmitted from any of the ports to which the VLAN designation has been assigned.

The VLAN designation for each port is stored in a memory portion of the switch such that every time a message is received on a given access port, the VLAN designation for that port is associated with the message. In many cases, it may be desirable to interconnect a plurality of these switches in order to extend the VLAN associations of ports in the network. Those entities having the same VLAN designation function as if they are all part of the same LAN. VLAN-configured bridges are specifically configured to prevent message exchanges between parts of the network having different VLAN designations in order to preserve the boundaries of each VLAN.

There are two types of VLAN behavior: tagged VLAN (where the host, i.e., an originating device/terminal, has the responsibility to tag any outgoing packet with the appropriate VLAN ID, and the switch will drop packets received on that port that are tagged with the wrong ID); and untagged VLAN (where the host is unaware of the VLAN ID, and the switch has the task of placing the VLAN header on any outgoing packets). While at first glance it appears that untagged VLAN is the simplest option with less administrative burden, in the case where more than one VLAN ID must be carried over the same port, it becomes necessary to use tagged VLAN. That is, untagged VLAN only works if there is only one VLAN ID on that port, since all untagged packets on the port will be tagged by the specified VLAN ID.

In the case of tagged VLAN, the host must be configured to know which VLAN ID(s) can be sent from a specific host because using the wrong VLAN ID will result in the switch dropping the packet. There is therefore an administrative problem with conventional tagged VLAN protocols of making sure each host knows of all the VLAN IDs that may be utilized on all of the host's ports.

SUMMARY OF THE INVENTION

Disclosed is a method, system and network protocol that enables each host within a virtual local area network (VLAN) environment to automatically discover to which VLANs the host belongs, without any explicit administrative configuration. When a host initially sets up a communication interface, the host generates a series of probing packets, each tagged with (or included within its header) a different one of the range of possible VLAN IDs. The probing packet requests a response from the switch indicating whether the corresponding VLAN (identified by the VLAN ID) is supported by the switch. The switch automatically drops any packets with a VLAN ID not recognized (i.e., supported or configured) in the switch. Packet responses are provided from the network for those packets that are configured within the switch. Thus, the interface only receives a response for those request packets having a VLAN ID associated with a supported VLAN. Based on which issued requests receive a response, the host interface then knows which VLAN ID(s) are the correct VLAN IDs for that port, and the host is able to safely assign/utilize those VLAN IDs for outgoing traffic.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method, system and network protocol that enables each host within a virtual local area network (VLAN) environment to automatically discover to which VLANs the host belongs, without any explicit administrative configuration. When a host initially sets up a communication interface, the host generates a series of probing packets, each tagged with (or including within its header) a different one of the range of possible VLAN IDs. According to the illustrative embodiment described using the IEEE 802.1Q protocol, the range of valid VLAN IDs is 1 through 4094. The probing packets request a response from the network for each potential VLAN ID the port belongs to.

The probing packet triggers a response that ultimately indicates whether the corresponding VLAN (identified by the VLAN ID) is supported by the switch. The switch automatically drops any packets with a VLAN ID not recognized (i.e., supported or configured) in the switch. The packets belonging to supported VLANs pass through the switch to the network, which provides responses for those packets. Thus, the interface only receives a response for those request packets having a VLAN ID associated with a supported VLAN. Based on which issued requests receive a response, the host interface then knows which VLAN ID(s) are the correct VLAN IDs for that port, and the host is able to safely assign/utilize those VLAN IDs for outgoing traffic. In one embodiment, a software-enabled algorithm (utility) is utilized that enables the host to automatically discover to which VLANs the host is affiliated.

Figure 1:
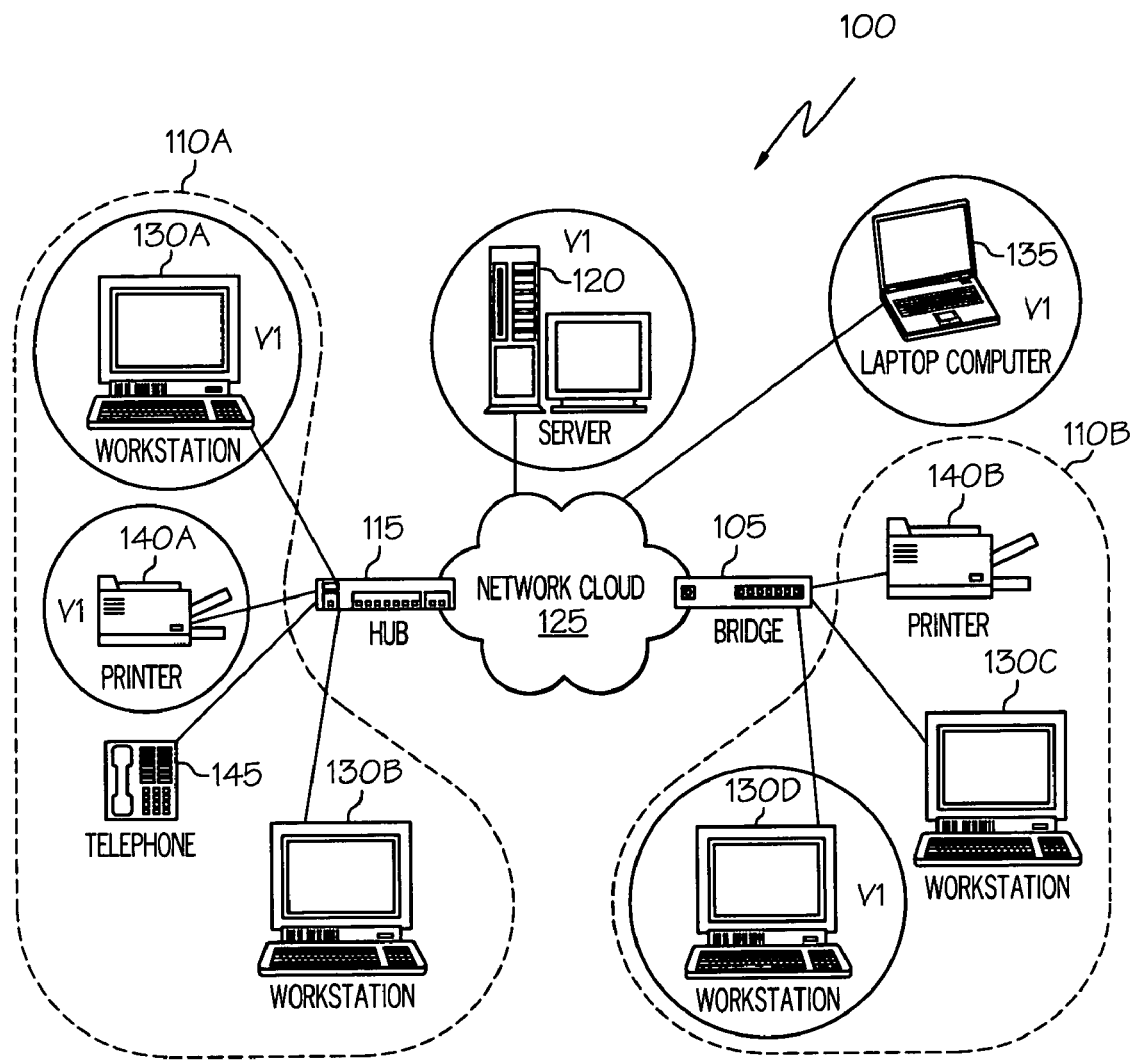
FIG. 1 is a network diagram depicting a virtual local area network (VLAN) within which embodiments of the present invention may advantageously be implemented.

With reference now to the Figures and in particular with reference to FIG. 1, there is illustrated an exemplary network 100 having a VLAN 125 within which various features of the invention may advantageously be implemented. A first LAN 110A comprised of two work stations 130A and 130B, a printer 140A, and a telephone device 145, shares several of its components/devices with a second LAN 110B within VLAN 125. Second LAN 110B comprises two workstations 130C and 130D and a printer 140B. VLAN 125 comprises end node devices from two LANs 110A and 110B, as well as a stand alone laptop computer 135. Each device that is a component of VLAN 125 is circled and labeled "V1," while each LAN 110A and 110B is identified with a dashed perimeter line.

Connecting the various components of first LAN 110A to each other and to the larger network 100 is a network hub (or gateway/router) 115. Also, connecting the various components of second LAN 110B to each other and to the larger network 100 is a network bridge 105. The interconnection of the two LANs and laptop computer is illustrated as a network cloud (interconnect) 125, which may comprise any series of devices that support distributed network connectivity, conventionally referred to as a wide area network (WAN). For simplification of the description, both the network hub 115 and bridge 105 are generally referred to hereinafter as a switch (or network switch).

Thus, according to FIG. 1, VLAN 125 is the group of circled devices existing on different physical LAN segments which communicate with each other via a network-to-network interconnect 125. VLAN 125 comprises server computer 120, first and fourth workstations 130A and 130D, printer 140A, and laptop computer 135. Once these end node devices are connected through VLAN 125, the end node devices act as if they are on the same physical LAN segment. While a specific illustration of network and specifically a VLAN has been provided herein, those skilled in the art will recognize that any combination of end nodes and switches could be utilized for the VLAN. The specific network and VLAN embodiment illustrated by FIG. 1 is for illustrative purposes only.

An end node device, such as laptop computer 135, for illustration, is referred to as a host device whenever that end node device seeks to initiate a transmission of packets across the network. Since the transmission will only be permitted within the VLANs to which a host is configured, the host is provided a software program/algorithm that allows the host to self-configure for routing data packets whenever an interface is opened by the host.

Figure 2:
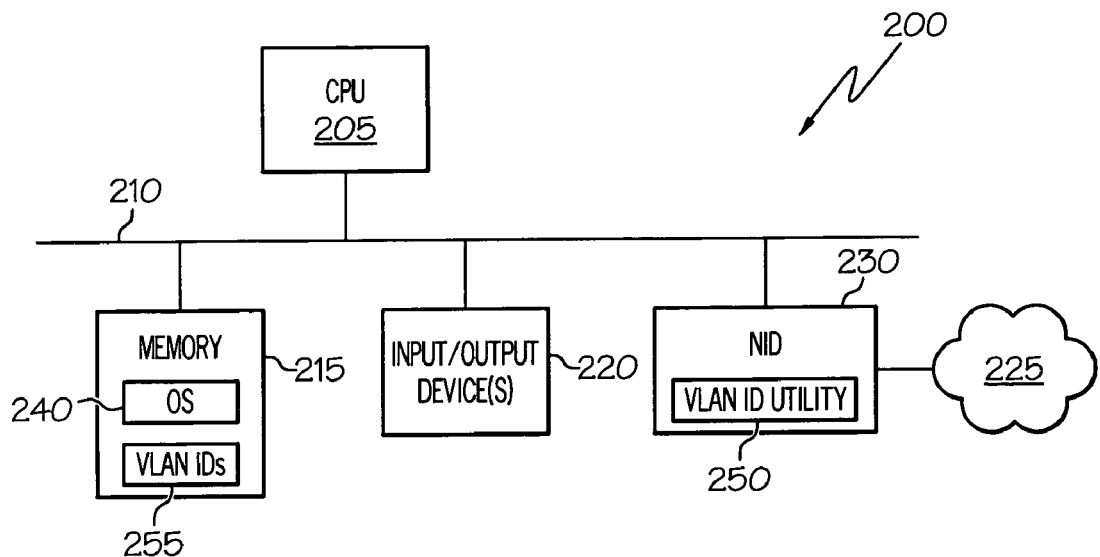
FIG. 2 is a block diagram illustrative of a data processing system that may be utilized as a host device from which request packets are generated having VLAN IDs associated therewith, according to one possible implementation of the invention.

An exemplary host is illustrated by FIG. 2. As shown, host 200 comprises basic hardware components similar to those of a computer system (since exemplary host system is laptop computer 135). Specifically, host 200 comprises a processor (or CPU) 205 coupled to memory 215 and I/O devices 220 (not individually shown) via a system bus/interconnect 210. Host 200 further comprises a network interface device (NID) 230 for connecting host 200 to a network 225, such as exemplary VLAN 125 of FIG. 1. Depending on the type of network, NID 230 may be a modem, Ethernet card, or other network communication device.

In addition to the hardware components, host system 200 also comprises software and/or firmware that enable the hardware components to function. As illustrated, host system 200 includes operating system (OS) 240 and VLAN ID utility 250, which is illustrated as an internal component of NID 230. In other implementations, VLAN ID utility 250 is programmed within a device driver of NID 230 or is a component (sub-routine) of OS 240. VLAN ID utility 250 enables the various features provided by host system during activation of a communication with the network.

When host 200 first initiates a communication with a network switch to which host 200 is connected, host 200 executes the VLAN ID utility 250 on its processor 205 and activates its VLAN packet transmission functionality. The utility 250 generates tagged request packets (which include the range of possible VLAN IDs) that are issued to the network (via NID 230), as described below, and certain of these packets receives acknowledgement responses from the network that indicate to the host 200 which VLANs the switch is configured to communicate with. The VLAN ID utility 250 analyzes the received responses, matches each response to the corresponding VLAN ID, and stores the supported VLAN ID at a particular location 255 in memory 215. The stored VLAN IDs are utilized during subsequent package generation and transmission to supported VLANs.

Figure 3:
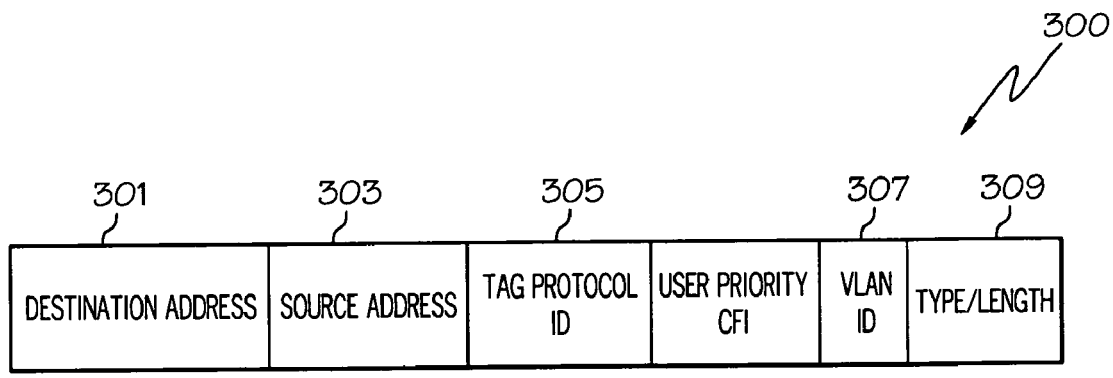
FIG. 3 is a block diagram of a sample request packet having therein a VLAN ID field according to one embodiment of the invention.

FIG. 3 illustrates a sample request packet generated by the utility 250. Request packet 300 comprises several compartments within which particular information is held. Among the information provided within the request packet are the destination address 301, host (or source) address 303, tag protocol ID 305, user priority 308, VLAN ID 307, and type/length 309. Since the request packet 300 has limited functionality, no actual data payload is illustrated within the request packet 300. Type/length 309 may identify to the receiving terminal (switch/router/gateway) that the request packet 300 is requesting a response/acknowledgment if the switch supports the specific VLAN ID provided within the packet 300.

Figure 4:
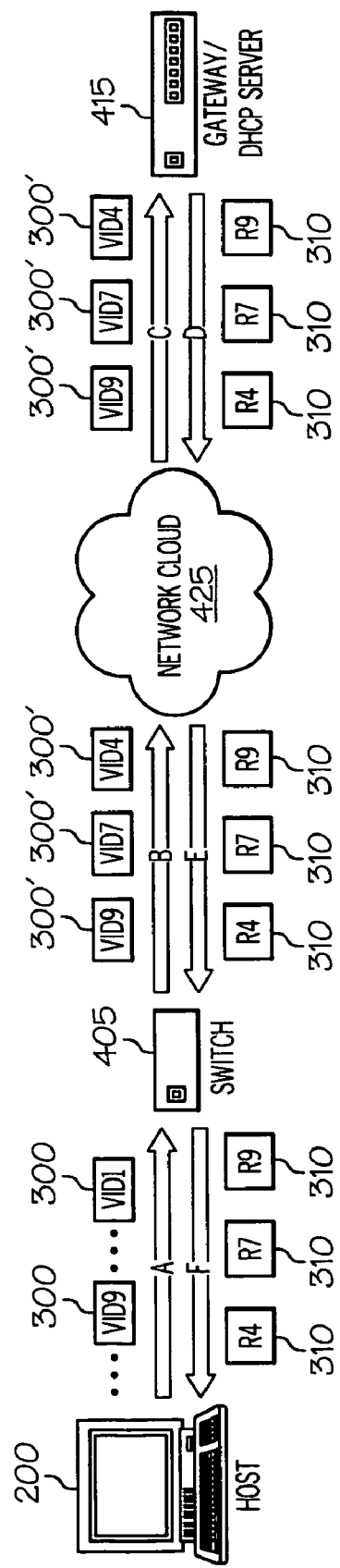
FIG. 4 diagrams the exchange of request packets and Responses between a host device (establishing an interface) and a switch having knowledge of supported VLAN IDs, in accordance with one embodiment of the invention.
Figure 5:
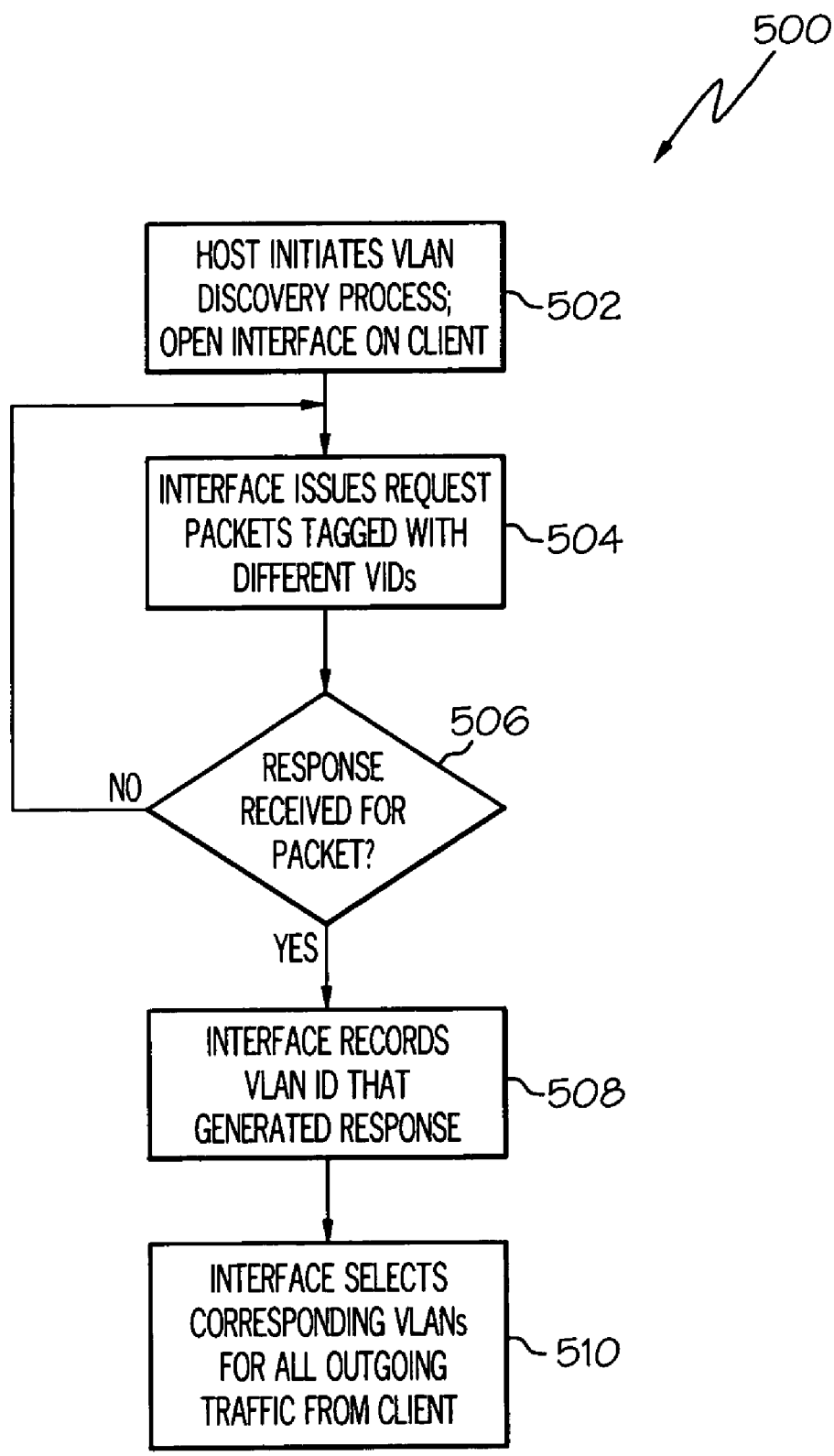
FIG. 5 is a flow chart generally diagramming the process of the host determining which VLAN IDs are supported utilizing the request packets, according to one implementation of the invention.

FIG. 4 diagrams the exchange of request packets and acknowledgement (ACK) responses between an exemplary host system 200, network switch 405, and other network components, while FIG. 5 provides a flow chart of the process of completing the above exchange from the perspective of the host system 200.

Generally, within FIG. 4, a stream of sequentially numbered request packets with VID 1 through 9 and beyond (up to VID 4094) 300 are being transmitted from host system 200 to switch 405. Specific request packets 300' with VIDs supported at the switch are also shown transmitting across the network 425 and ultimately to the destination gateway/DHCP server 415. Also, response packets 310 associated with those specific requests packets 300' that are supported at the switch (i.e., for packets allowed through the switch 405 to the network 425) are shown traversing in the opposite direction towards the host system 200. The transmission sequence is indicated by arrows labeled with letters of the alphabet, namely A through F. Because the request packets 300 are issued in sequential order from host, the ordering or packets in the forward and return directions are illustrated in sequence. However, it is contemplated that a large number of these request packets and response packets will simultaneously traverse the network and may cross each other in no particular sequence.

To simplify the description, only the first 9 request packets are assumed to have been issued from the host 200 and processed at the switch 405. The packets representing VLANs that are supported by the switch complete the transmission to the gateway/DHCP server 415, and responses generated are shown completing the loop back to the host system 200. Within the description herein, the number assigned the VID and the response corresponds to the number of the VLAN ID within the request packet and the response, respectively. The response IDs also correspond to the VLAN IDs within those request packets that pass through the switch 405 and are received at the gateway/DHCP server 415. Accordingly, request packets with VLAN IDs 4, 7, and 9 pass through the switch and responses 4, 7, and 9 are generated for these requests packets. The other request packets (i.e., 1-3, 5-6, and 8) were dropped by switch 405, and thus no response is being returned with those specific IDs. Host system 200 thus receives an indirect indication of which VLANs (i.e., 1-3, 5-6, and 8) are not supported by the switch and a direct indication of which VLANs (4, 7, 9) are supported by the switch.

FIG. 4 is utilized to describe the process steps of FIG. 5, which steps are referenced as numbered blocks. The process begins at block 502 when the host 200 opens a communication interface and initiates the VLAN discovery process. At this stage, the host system has either been statically configured with an IP (Internet Protocol) address and default gateway or it has been configured to use DHCP (Dynamic Host Configuration Protocol). With the former configuration mode, the default gateway will be the destination of the request packets (or probes) 300, while in the latter configuration mode, the DHCP server will be the destination of the request packets 300. At block 504, the VLAN ID utility generates a series of request packets 300, each tagged with (i.e., included within the header) a different VLAN ID, and the request packets are issued by the interface to the default gateway (for static IP configuration) or DHCP server (for dynamic configuration). Specifically, the interface sends either ICMP (i.e. ping) request packets addressed to the default gateway or broadcast requests for a DHCP server, with each packet tagged with a different VLAN ID (e.g. the first ping goes out with a VLAN ID of 1, then 2, through 4094).

When the switch 405 receives a request packet, the switch 405 completes the following: (a) checks the VLAN ID of the packet against the supported VLAN IDs; and (b) discards the packet with a VLAN ID that is not supported (i.e., for which the switch 405 is not configured); or (c) forwards the packet to the network 425 if the VLAN ID is supported. Only the supported packet are allowed to traverse the network towards the gateway/DHCP server 415.

Gateway/DHCP server 415 responds to receipt of a supported request packets by issuing a response 310 for each request packet 300 that contains a VLAN ID that is supported. The response 310 travels back through the network and switch 405 to the host system 200. Thus, switch 405 drops the request packets with VLAN IDs of VLANs for which the switch is not configured to support and no response 310 is sent back to host system 200 from gateway/DHCP server 415.

Returning now to FIG. 5 (describing the host interface side of the process), a determination is made at block 506 whether an acknowledgment response is received for each of the packets. In actuality, the responses received are parsed to determine to which VLAN ID they are associated, and the utility assigns those VLAN IDs without requiring a separate check of which requests were in fact responded to. If a particular request was provided a response, indicating that the VLAN ID contained in the request is of a supported VLAN, the utility records the VLAN ID in memory, as shown at block 508.

The VLAN ID utility records which VLANs ICMP replies or DHCP server replies were received and stores the associated IDs for identifying the VLANs for outgoing traffic. Thus, when actual communication/transmission is later performed, the interface accesses/references the stored/recorded list of VLAN IDs from the above process and transmits full data packets to only those VLAN IDs identified in the process as being supported, as shown at block 510.

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal-bearing media used to actually carry out the distribution. Examples of signal-bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. In a network connected device, a method for VLAN ID (Virtual Local Area Network Identifier) discovery for Ethernet ports comprising:

generating a series of request packets from a host device, wherein said generating said series of request packets includes:

opening a network interface between said host device and a network switch supporting at least one VLAN identified by a unique VLAN ID out of a plurality of different possible VLAN IDs previously stored in said host device;

in response to said opening said network interface, automatically generating each said request packet containing a destination ID of a network gateway/DHCP (Dynamic Host Configuration Protocol) server accessible via a connected network through said network switch; and encoding within said generated request packet said unique VLAN ID;

issuing said series of generated request packets to said network switch, wherein each said request packet requests a response from said network switch indicating whether a VLAN associated with said unique VLAN ID encoded within each said request packet is supported by said network switch;

receiving a response packet from said network switch;

determining from a response ID associated with said received response packet whether a VLAN having a corresponding VLAN ID is supported by the network switch, wherein said determining includes:

parsing a header of the response packet for the associated ID; and matching the associated response ID to a corresponding VLAN ID within said plurality of VLAN IDs previously stored in said host device;

storing the corresponding VLAN ID matching the associated response ID within a storage location, wherein said storage location is utilized for selecting VLAN IDs of supported VLANs for encoding within data packets being generated at the host device; and subsequent to storing within said storage location the corresponding VLAN ID matching the associated response ID, issuing data packets to only those VLANs that are supported within the network switch, wherein said issuing includes:

generating a data packet; and encoding a VLAN ID register within the data packet with one of said VLAN IDs from among multiple VLAN IDs stored within the storage location.

* * * * *